United States Patent [19]
Schreiner

[11] Patent Number: 5,842,332
[45] Date of Patent: Dec. 1, 1998

[54] COTTON HARVESTER ROW UNIT HOUSING WITH EXTRUDED SLOTS

[75] Inventor: Joel Marvin Schreiner, Ankeny, Iowa

[73] Assignee: Deere & Company, Moline, Ill.

[21] Appl. No.: 821,127

[22] Filed: Mar. 20, 1997

[51] Int. Cl.⁶ ................................................ A01D 46/08
[52] U.S. Cl. ..................... 56/28; 56/33; 56/85; 56/119
[58] Field of Search .................................. 56/28, 33, 35, 56/49, 85, 95, 119; 460/114

[56] References Cited

U.S. PATENT DOCUMENTS 2,284,909  6/1942  Kuhlman ................................ 56/119
2,571,224  10/1951 Edwards ................................ 56/119
3,397,523  8/1968  Hubbard ................................ 56/119
5,490,372  2/1996  Schlueter ................................ 56/33

*Primary Examiner*—Thomas B. Will
*Assistant Examiner*—Arpad Fabian Kovacs

[57] ABSTRACT

A row unit for a cotton stripper includes a unit auger housing with extruded slots punched with a small rim or periphery. The slots are configured such that adjacent row slot centerlines are aligned to give the housing added strength while still providing good foreign material elimination through the slots. The extruded slots eliminate sharp edges and allow trash to easily exit. The extruded slots also provide a smoother surface for conveying the cotton material along the auger housing.

9 Claims, 2 Drawing Sheets

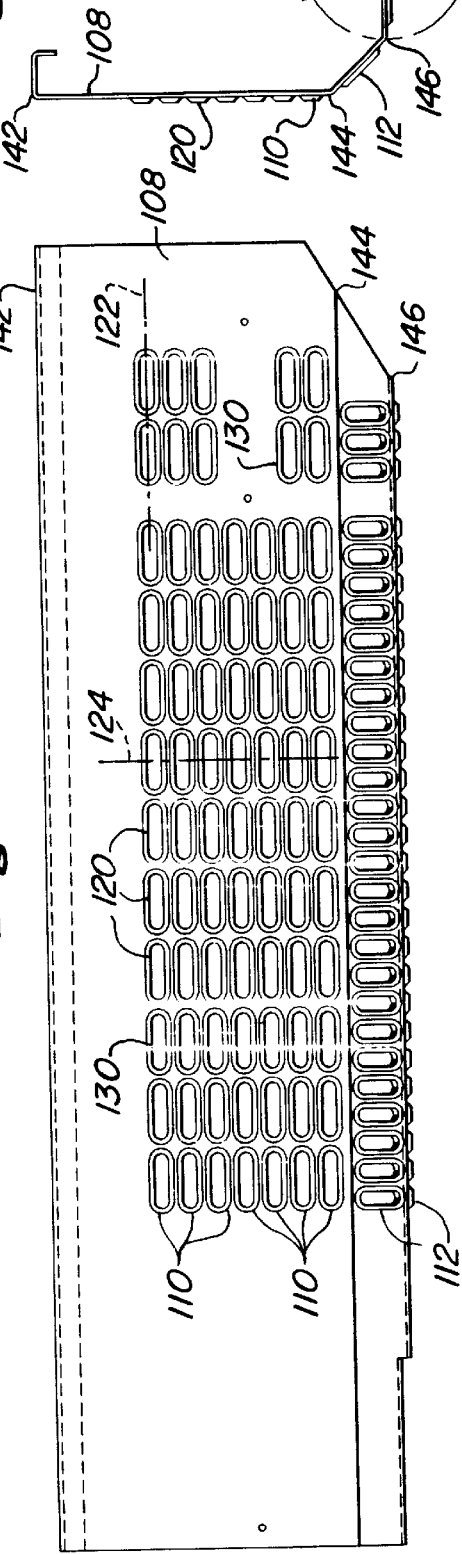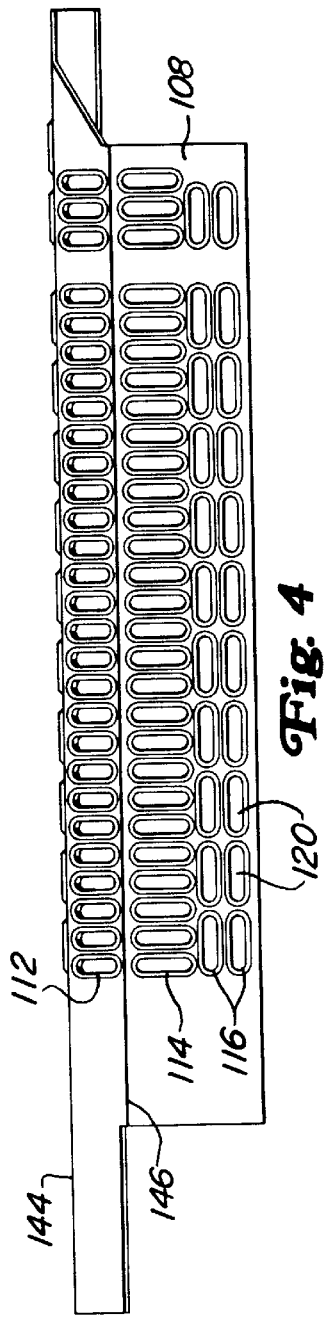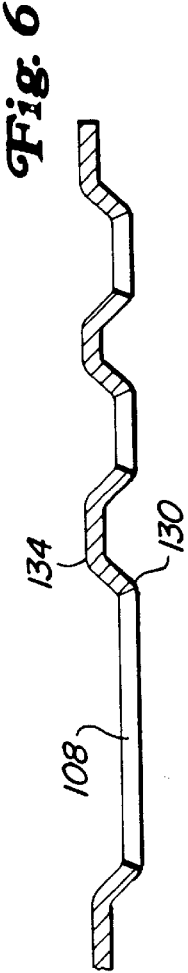

COTTON HARVESTER ROW UNIT HOUSING WITH EXTRUDED SLOTS

BACKGROUND OF THE INVENTION

1) Field of the Invention

The present invention relates generally to cotton harvesters and, more specifically, to an improved row unit auger housing for a cotton stripper or similar harvester.

2) Related Art

Presently available cotton strippers such as the John Deere Model 7445 Cotton Stripper and the 7450 Cotton Stripper include individual row units supported forwardly of a cross-auger frame. Cotton along with cotton stalks and other debris is swept from the row-receiving area by a pair of brush rolls supported on either side of the row of cotton and angling upwardly in the rearward direction. An auger supported above an angled auger housing outwardly of each of the brush rolls conveys the material rearwardly to the cross auger.

The stripper auger housing provides structural support for the unit and typically is constructed with a series of slots or holes which allow foreign material such as rocks, sticks and dirt to exit the housing while cotton is conveyed rearwardly to the cross auger. To increase cleaning efficiency, the number of slots can be increased, but such increase results in lowering the overall strength of the unit structure. The reduced strength makes the unit more vulnerable to damage from large rocks, stumps and other objects which from time to time can get caught between the auger and the auger housing. In addition, the sharp edges of the conventional slotted auger housing can catch material including the cotton and impede flow through the unit.

To help guard against rock damage, some stripper row units are now equipped with a strap. The strap increases the auger housing strength but reduces cleaning efficiency by partially covering the slots in the area most susceptible to damage.

BRIEF SUMMARY OF THE INVENTION

It is therefore an object of the present invention to provide an improved cotton harvester row unit housing that overcomes most or all of the aforementioned problems. It is a further object to provide such a housing with improved conveying ability. It is another object to provide such a housing wherein housing strength remains uncompromised.

It is yet another object of the invention to provide an improved stripper type row unit housing that has improved material conveying and cleaning characteristics compared to at least most previously available cotton stripper housings. It is a further object to provide such a harvester that is stronger than at least most housings and does not require separate strengthening members such as straps and the like.

It is another object of the invention to provide a cotton harvester row unit housing having increased strength without sacrificing cleaning area.

A cotton stripper row unit housing is constructed with an improved auger housing having extruded, rimmed slots. Each of the slots is punched with the rim or leg extending continuously around the slot periphery. The slot structure increases housing strength without sacrificing cleaning area and efficiency. No additional straps or other parts are necessary to protect the unit against damage. The extruded slots eliminate sharp edges associated with traditional flat slots to allow trash to more easily exit the unit. The extruded slots also provide a smoother surface for better and more efficient cotton conveying.

These and other objects, features and advantages of the present invention will become apparent to one skilled in the art upon reading the following detailed description in view of the drawings.

BRIEF DESCRIPTION OF THE DRAWINGS

FIG. 3 is an elevational view of one side of the auger housing.

FIG. 4 is a bottom view of the auger housing of FIG. 3.

FIG. 5 is an end view of the auger housing of FIG. 3.

FIG. 6 is an enlarged view of a portion of the auger housing showing details of the rimmed portion of the slots.

DETAILED DESCRIPTION OF THE DRAWINGS

Figure 1:
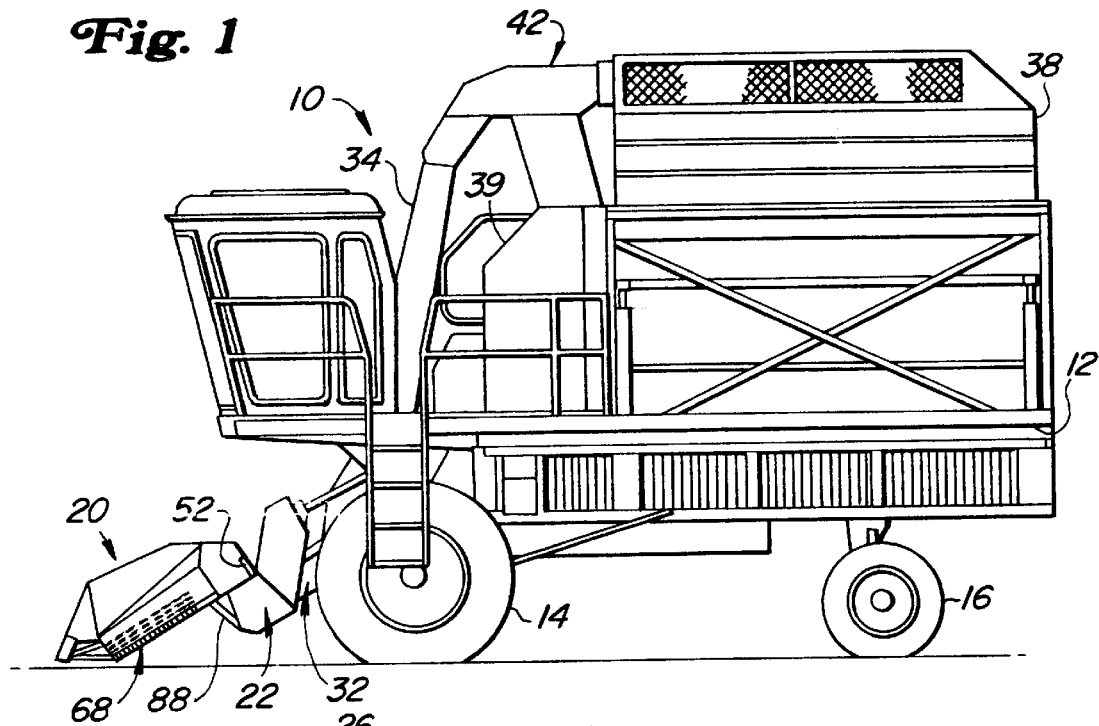
FIG. 1 is a side view of a cotton stripper with the improved row unit auger housing of the present invention attached thereto.

Referring now to FIG. 1, therein is shown a cotton stripper 10 having a main frame 12 supported by front drive wheels 14 and rear steerable wheels 16 for forward movement through a field planted with parallel rows of cotton plants. A plurality of stripper row units 20 are supported from the frame of a transversely extending cross-auger 22 connected by lift arms on the front of the frame 12. The units 20 include stripping structure 26 for removing portions of the cotton plants from the row, and conveying structure 28 for carrying the removed material rearwardly and depositing the material into the cross auger 22. The cross auger 22 includes counter-rotating flights for moving the deposited material to a central outlet location at the rear of the auger 22. A dense material separating chamber 32 connects the auger outlet with the input to the main upright duct 34 leading to the harvester basket 38 and/or cleaner 39 supported on the frame 12. Material is conveyed by air upwardly and rearwardly to upper grate structure 42 and then rearwardly into the basket 38 or downwardly into the cleaner 39.

Figure 2:
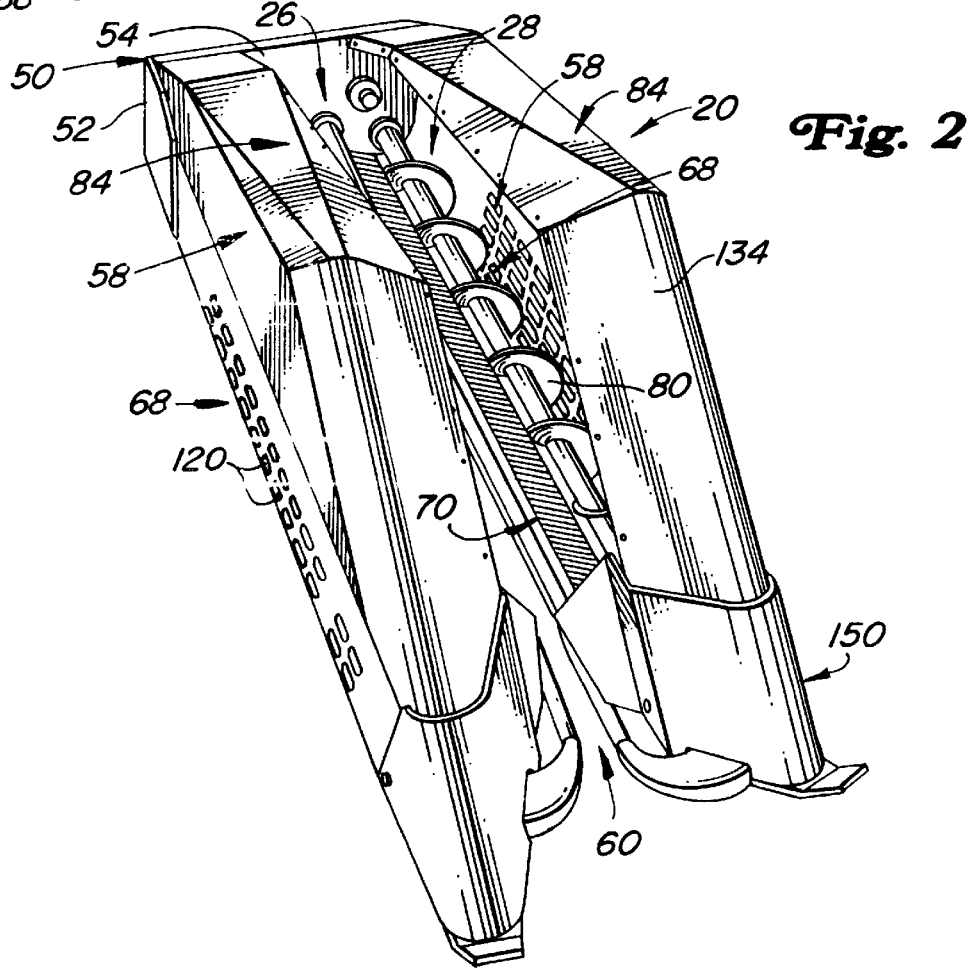
FIG. 2 is a perspective view of one of the row units for the harvester of FIG. 1.

As best seen in FIG. 2, the row unit 20 includes a frame assembly 50 having a rear structural member 52 with an upright transverse panel 54. A pair of transversely spaced supports 58 are cantilevered from the lower portion of the rear structural member 52. The supports 58 extend forwardly to define a central row-receiving area 60 and a pair of auger troughs 68 outwardly adjacent the stripping structure 26.

The stripping structure 26 includes a generally conventional brush or stripper roll 70 supported for rotation about a fore-and-aft extending axes. Outwardly of each stripper roll 70, an auger 80 is supported for rotation above the corresponding auger trough 68. Stripper roll and auger drive structure located behind the panel 54 power the stripping structure 26 and augers 80. Row unit covers 84 are supported by the row unit frame assembly 50 on either side of the row-receiving area 60 above the supports 58.

The row unit 20 is pivotally connected to the frame of the cross auger 22 for rocking about a transverse axis. A height control cylinder 88 is connected between the lower portion of the row unit frame assembly 50 and the cross auger 22 for pivoting the unit. The harvester header which includes the cross auger 22 and row units 20 is connected by conventional hydraulically controlled lift arm structure to the harvester frame 12 for raising and lowering the row units 20. The separation chamber 32 is supported from the harvester frame 12 and pivots about the lift arm pivotal axis with the header as the cross auger 22 is raised and lowered.

With the exception of the auger troughs 68, the harvester 10 and row unit 20 are generally of conventional construction and may be of the type shown and described by commonly assigned U.S. Pat. No. 5,394,679. If further details of the unit structure are desired, reference may be had to the 5,394,679 patent.

Referring now to FIGS. 3–6, the construction of the auger troughs 68 will now be described in detail. The troughs 68 are fabricated from sheet metal 108 (FIG. 3) having rows 110, 112, 114 and 116 of rimmed slots 120 extruded therein. Each of the slots 120 is elongated and has a slot centerline 122 parallel to the major axis of the slot and a transverse centerline 124 perpendicular to the major axis of the slot. The slot 120 includes a continuous rim 130 projecting from the plane of the sheet metal 108 away from the auger 80. A transition area 134 defines a radiused or rounded portion leading from the plane of the auger side of the sheet metal to the rim 130 so that the boundaries of the slot 120 in the auger trough 68 provide a relatively smooth surface without sharp edges within the trough.

In the preferred embodiment, the centerlines 122 and 124 for each set of slots 120 are aligned (see FIG. 3) both in the fore-and-aft direction and in the upright direction to provided increased trough strength. The sheet metal 108 with the slots 120 punched therein is formed with straight bends at 142, and at 144 between the rows 112 and 110 and at 146 between the rows 112 and 114 to define a portion of the trough 68. The centerlines 122 for the row of slots 112 are perpendicular to the centerlines 122 for the adjacent row of slots 110 on the opposite side of the bend 144 (FIGS. 4 and 5).

In operation, the cotton plants enter the row-receiving area 60 where the counter-rotating stripper rolls 70 strip cotton bolls and stalk material from the plants and propel the stripped material toward the augers 80. The augers 80 convey the stripped material rearwardly, and the auger housing slots 120 facilitate removal of dirt from the auger trough 68. The absence of sharp slot edges provided by the fabrication of the slot 120 with a rounded transition area leading into the rim 130 provides a smooth conveying surface for cotton material. The combination of the bends with the rimmed slots 120, which increase the material and edgewise cross section of the final formed sheet 108, provide a sturdy structural member resistant to bending and to damage from objects such as rocks and stumps.

The augers 80 direct the rearwardly conveyed material downwardly through rear openings in the row unit and into the cross-auger 22 where counter-rotating flights move the material to the central outlet which opens into the separating chamber 32. The air current lifts and propels the fluffy ripe cotton rearwardly along the chamber 32 and upwardly toward the bottom of the duct 34 where suction moves the cotton upwardly. Heavier material such as green bolls fall through openings in the separation chamber.

Having described the preferred embodiment, it will become apparent that various modifications can be made without departing from the scope of the invention as defined in the accompanying claims.

What is claimed is:

1. In a cotton harvester having a main frame supported for forward movement through a field of cotton planted in parallel rows, a row unit for removing cotton material from a row of plants and including a row unit housing and at least one auger supported within the housing for moving the cotton material from the row, the row unit housing comprising:

an auger housing portion located adjacent the auger, the housing including a sheet-like portion having a preselected thickness and a plurality of slots; and wherein the slots include peripheries with rim portions extending from the plane of the sheet generally around the peripheries, the rim portions being continuous and projecting from the plane of the sheet a distance greater than the preselected thickness, thereby providing increased strength to the auger housing portion.

2. The invention as set forth in claim 1 wherein the rim portions project from the plane of the sheet in a direction away from the auger.

3. The invention as set forth in claim 1 including rounded transition areas between the slots and the rim portions thereby eliminating sharp edges on the slot peripheries to improve cotton flow efficiency over the slots.

4. The invention as set forth in claim 1 wherein the slots are punched to form the continuous rim portions.

5. The invention as set forth in claim 3 wherein the slots are punched to form the continuous rim portions.

6. In a cotton harvester having a main frame supported for forward movement through a field of cotton planted in parallel rows, a row unit for removing cotton material from a row of plants and including a row unit housing and at least one auger supported within the housing for moving the cotton material from the row, the row unit housing comprising:

an auger housing portion located adjacent the auger, the housing including a sheet-like portion having a plurality of slots;

wherein the slots include peripheries with rim portions extending from the plane of the sheet around the peripheries thereby providing increased strength to the auger housing portion, and wherein the slots include centerlines, and wherein the slots are arranged in rows with centerlines of the slots in a row being substantially aligned.

7. The invention as set forth in claim 6 wherein the sheet-like portion is fabricated from sheet metal of preselected thickness with slots extruded in the sheet metal so the rim portions extend from the plane of the sheet a distance greater than the preselected thickness to increase the dimension of the sheet as viewed from an edge of the sheet.

8. The invention as set forth in claim 6 wherein the sheet-like portion is bent to define a bend line, the bend line being straight and extending between adjacent rows of the slots and cooperating with the slot peripheries to define therewith a trough portion with increased strength over that of sheet-like portion without slot peripheries.

9. The invention as set forth in claim 8 wherein the slot centerlines on one side of the bend line are perpendicular to the slot centerlines on the adjacent row of slots on the opposite side of the bend line.

* * * * *